BUTADIENE EXTRACTION AND PURIFICATION
Original Filed Oct. 29, 1965
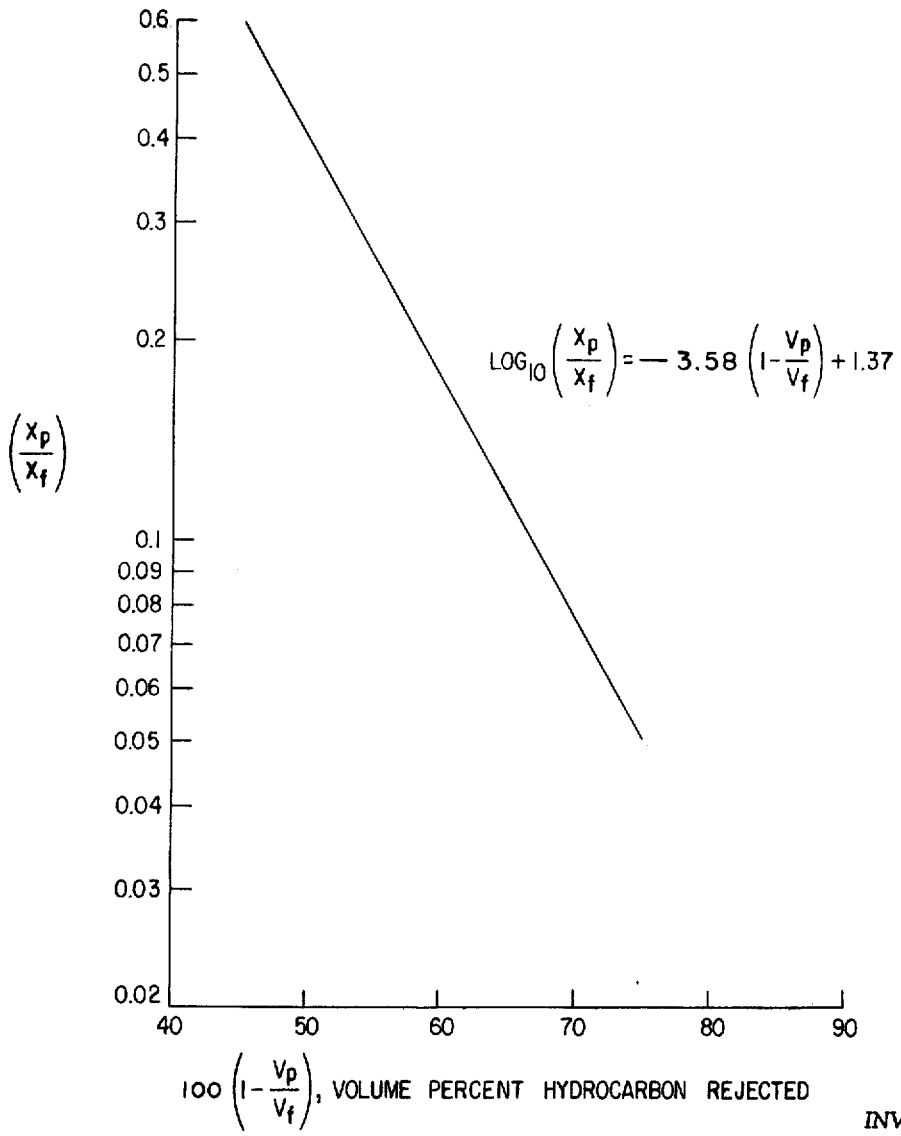
INVENTOR
GUY Z. MOORE, JR.
BY McCarthy, Depaoli & O'Brien
ATTORNEYS.

United States Patent Office

Re. 26,794
Reissued Feb. 17, 1970

26,794

BUTADIENE EXTRACTION AND PURIFICATION

Guy Z. Moore, Jr., Odessa, Tex., assignor to El Paso Products Company, Odessa, Tex., a corporation of Texas Original No. 3,296,329, dated Jan. 3, 1967, Ser. No. 505,679, Oct. 29, 1965. Application for reissue June 3, 1968, Ser. No. 741,823
Int. Cl. C07c 7/16
U.S. Cl. 260—681.5 5 Claims

Matter enclosed in heavy brackets [ ] appears in the original patent but forms no part of this reissue specification; matter printed in italics indicates the additions made by reissue.

*ABSTRACT OF THE DISCLOSURE*

*There is disclosed a method of purifying a hydrocarbon-containing cuprous ammonium acetate solution having butadiene and $C_4$-hydrocarbon impurities therein which includes the steps of introducing an essentially single phase hydrocarbon-containing cuprous ammonium acetate solution into a quiescent settling zone, controlling and maintaining the solution under non-turbulent flow conditions for a period of time sufficient to establish the condition wherein the ratio*

$$\frac{X_p}{X_f}$$

*is a function of the ratio*

$$1-\frac{V_p}{V_f}$$

*characterized by the equation:*

$$\log_{10}\left(\frac{X_p}{X_f}\right)=-3.58\left(1-\frac{V_p}{V_f}\right)+1.37$$

*wherein $X_p$ represents the $C_4$-hydrocarbon impurities, excluding 1,2-butadiene, expressed as volume percent of the total hydrocarbons contained in the cuprous ammonium acetate solution leaving the settling zone, $X_f$ represents the $C_4$-hydrocarbon impurities, excluding 1,2-butadiene, expressed as volume percent of the total hydrocarbons contained in the cuprous ammonium acetate solution fed to the settling zone, $V_p$ represents the volume percent of total hydrocarbons in the cuprous ammonium acetate solution leaving the settling zone, $V_f$ represents the volume percent of total hydrocarbons in the cuprous ammonium acetate solution fed to the settling zone, and*

$$100\left(1-\frac{V_p}{V_f}\right)$$

*represents the volume percent of hydrocarbon rejected from the cuprous ammonium acetate solution in the settling zone, and*

$$100\left(1-\frac{V_p}{V_f}\right)$$

*is always a value of at least 40.*

The present invention relates, in general, to the extraction and purification of butadiene from a mixture of $C_4$ hydrocarbons and in particular, to improvements in the cuprous ammonium acetate process for the extraction of butadiene from a mixture of $C_4$ hydrocarbons for the recovery of hi-purity butadiene suitable for use in synthetic rubber production and as a chemical intermediate.

The cuprous ammonium acetate process, otherwise known as the CAA process is basically a liquid-liquid extraction to remove butadiene from a mixture of $C_4$ hydrocarbons. Olefins are selectively retained in the aqueous solution by the formation of loose chemical compounds with a cuprous ion. Ammonium and acetate ions keep or retain the copper and addition compounds in solution. The stability of the complex is a direct function of the degree of unsaturation of the olefin. Characteristically, diolefins will displace mono-olefins and thus require higher regeneration temperatures than mono-olefins. In a similar manner, acetylenes may be selectively removed from a solution containing diolefins and other less reactive compounds. The utility of the CAA process is dependent upon the absorption characteristics of the cuprous ammonium acetate solvent which is employed in the execution of the process as an aqueous solution of cuprous ammonium acetate. This solvent absorbs butadiene by forming a chemical complex; least stable complexes are produced with mono-olefins and none at all with saturated hydrocarbons. The reactions are rapid and reversible, the complexes becoming less stable as the temperature is raised. This allows purification of an extract by countercurrent displacement of mono-olefins with butadiene and subsequently recovered butadiene by heating. In the operation of a typical CAA unit, a $C_4$ hydrocarbon mixture is extracted with a cuprous ammonium acetate solvent at reduced temperature in a number of countercurrent stages. Each stage consists of a mixer and settler, with a pump to transfer the hydrocarbon to the next stage. In the "absorption" stages, butadiene is almost complely removed from the $C_4$ hydrocarbon cut. In the extract purification or "stripping" stages, the extract is freed of hydrocarbons less strongly complexed than butadiene; namely mono-olefins and saturated hydrocarbons. The function of the absorption section is to extract the butadiene in a crude fashion from the $C_4$ hydrocarbon feed. By the term "crude fashion" is meant that substantial amounts of the order of 5 to 20% based on the butadiene, of the other hydrocarbons and especially the butylenes are extracted along with the butadienes. The function of the enriching section is to reject the impurities, principally the iso- and normal butylenes, so as to permit a recovery of the rich CAA solution containing relatively pure butadiene of the order of at least 98.5%. More specifically, in a typical CAA extraction process the lean CAA solution enters the absorption section and passes toward and through the enriching stages while the fresh butadiene bearing stream is admitted into the system preferably between the two sections to effect a countercurrent flow of the CAA solution and butadiene bearing stream. The crude rich CAA from the absorption section containing the bulk of butadienes and some of the butylenes then passes through the enriching sections where the butylenes are rejected and passed back through the extraction stages. The rejection is effected by countercurrent contact with a butadiene rich hydrocarbon stream as the CAA solution passes through the enriching sections. This is accomplished in accordance with known techniques such as, for example, the temperature of the last stage of the enriching section is raised to reject some of the butadiene absorbed in the CAA solution and the separated butadiene is recycled to the earlier enriching stages to accomplish the stripping. The remaining extract is delivered to a desorber, which is normally a packed or plate column of conventional design with a steam-heated reboiler. Butadiene is taken overhead and regenerated cuprous ammonium acetate solvent, virtually free of butadiene, is removed as a bottoms produced. This solvent is subsequently recycled to the absorption stages.

After water scrubbing, the butadiene is sent to an efficient fractionating column for removal of butadiene-1,2 and polymer. While these prior art processes have heretofore performed satisfactorily in providing a butadiene product of a purity of the order of about 98.5%, it has been observed that attempts to increase the purity of the butadiene obtained from such processes are fraught with difficulties because of the manner of construction of the settler unit of the last rejection stage which causes entrainment difficulties. As a result thereof the so-called rejector operates with poor settling efficiency causing unnecessary "carry under" of impurities with the desired butadiene product such that the purity of the ultimate desired butadiene product is difficult to obtain above about 98.5%.

Accordingly, it is an object of this invention to provide an improved method of purifying a hydrocarbon-containing cuprous ammonium acetate solution which contains butadiene and other $C_4$ impurities.

Another object of this invention is to provide a method whereby a high-purity butadiene product of the order of 99.6% can be produced.

Still another object of this invention resides in the provision of a method for the production of a high-purity butadiene product which can be produced on a continuous schedule.

In accordance with the above-described objects, means have been devised wherein a butadiene product of exceptionally high purity is obtained which comprise the process of introducing an essentially single phase hydrocarbon-containing cuprous ammonium acetate solution into a quiescent settling zone controlled and maintained under non-turbulent flow conditions for a period of time sufficient to establish the condition wherein the ratio $$\frac{X_p}{X_f}$$

is a function of the ratio $$\left[1\frac{V_p}{V_f}\right]$$

$$1-\frac{V_p}{V_f}$$

in accordance with the equation:

$$\log_{10}\left(\frac{X_p}{X_f}\right)=-3.58\left(1-\frac{V_p}{V_f}\right)+1.37 \quad (1)$$

wherein $X_p$ represents the $C_4$-hydrocarbon impurities, excluding 1,2-butadiene, expressed as volume percent of the total hydrocarbons contained in the cuprous ammonium acetate solution leaving the settling zone, $X_f$ represents the $C_4$-hydrocarbon impurities, excluding 1,2-butadiene, expressed as volume percent of the total hydrocarbons contained in the cuprous ammonium acetate solution feed to the settling zone, $V_p$ represents the volume percent of total hydrocarbons in the cuprous ammonium acetate solution leaving the settling zone, $V_f$ represents the volume percent of total hydrocarbons in the cuprous ammonium acetate solution fed to the settling zone and $$100\left(1-\frac{V_p}{V_f}\right)$$

represents the volume percent of hydrocarbons rejected from the cuprous ammonium acetate solution in the settling zone *and is a value of at least 40* since $X_p$ represents the volume percent of $C_4$-hydrocarbon impurities in the total hydrocarbon content of the cuprous ammonium acetate solution leaving the settling zone, the term may be replaced by the following:

(100—final purity)

where "final purity" represents the volume percent of butadiene present in the $C_4$-hydrocarbon content of the cuprous ammonium acetate solution leaving the settling zone. Also, since $X_f$ represents volume percent of $C_4$-hydrocarbon impurities in the total hydrocarbon content of the cuprous ammonium acetate solution feed to the settling zone, that term may be replaced by the following:

(100—initial purity)

where "initial purity" represents the volume percent of butadiene present in the $C_4$-hydrocarbon content of the cuprous ammonium acetate solution feed to the settling zone.

Equation (1) thus becomes:

$$\log_{10}\left(\frac{100-\text{final purity}}{100-\text{initial purity}}\right)=3.58\left(1-\frac{V_p}{V_f}\right)+1.37 \quad (2)$$

Because of the many variables and large lag time between a variable change and its effect upon the operation of a typical butadiene purification plant utilizing cuprous ammonium acetate as a solvent, it has, heretofore, been difficult to maintain firm control of the operating conditions in order to understand the reasons which resulted in products of low purity, a purification unit of low capacity and high butadiene product losses that sometimes occur during plant operations.

Quite unexpectedly, while observing a batch of quiescent rich cuprous ammonium acetate solvent it appeared that it apparently rejected hydrocarbon upon standing at a given temperature. Thus, while not wishing to be bound by any particular theory or mechanism it became apparent that a relationship existed concerning the state of the rich cuprous ammonium acetate solvent under which it was maintained and the ultimate purity of the butadiene product. As a result thereof, the phenomenon was more thoroughly investigated by feeding various feed streams from a conventional cuprous ammonium acetate extraction unit through small vessels such that a short diffusion path existed for material transfer between the phases.

A true equilibrium then exists across the interface between the two phases. A differential equilibrium is that condition when opposing reaction rates are equal. In an existing cuprous ammonium acetate extraction unit a mixer is immediately followed by a settler in which an attempt is made to separate the hydrocarbon and cuprous ammonium acetate phases. This separation occurs in a reasonably short time if the temperature is such that viscosity does not slow down the phase separation. In order to provide an understanding of the principles upon which the invention is based one need only consider a small volume of CAA solution at an arbitrary distance of one foot below the interface after phase separation occurs. This solution a few minutes before was in equilibrium with a hydrocarbon phase in the mixer, and the rate of reaction between CAA solution and hydrocarbon to form a coordination complex was equal to the rate of reaction for decomposition of the complex to CAA and hydrocarbon. Since the hydrocarbon phase is no longer in direct contact with CAA solution at the point one foot below the interface, the equilibrium has been disturbed by the removal of one of the reactants or products depending upon which reaction is being considered. Since no hydrocarbon phase is present, the CAA phase must reject or form a hydrocarbon phase in an attempt to maintain equilibrium. The hydrocarbon phase formed is of much lower density than the CAA phase, and as a result, rises and separates from the CAA phase. Theoretically, this phenomenon should continue to occur until the diffusion of hydrocarbon from the bulk of the hydrocarbon phase through the interface to a discrete position in the CAA phase equals the rate at which the hydrocarbon phase is formed within the CAA phase at this position.

Thus, armed with the above understanding of the principles underlying the present invention there is now provided methods for increasing the purity of a hydrocarbon-containing cuprous ammonium acetate solution having therein butadiene and $C_4$-hydrocarbon impurities which comprise introducing said cuprous ammonium acetate, as essentially a single phase material, into a quiescent, unobstructed settling zone controlled and maintained under non-turbulent flow conditions and maintaining said phase under said conditions for a period of time sufficient to allow any discrete hydrocarbon phase or droplets formed within the CAA phase to rise in a free state out of said phase and into and forming a hydrocarbon phase so that the hydrocarbon phase will be richer in $C_4$-hydrocarbon impurities than the hydrocarbon remaining in the CAA phase.

As used herein, the term $C_4$-hydrocarbon impurities has been employed for ease and convenience and is intended to include all of the impurities normally encountered in a typical CAA process for butadiene purification regardless of the source of the hydrocarbon feed stream. The impurities generally recognized are olefins and paraffins such as primary butylenes and butanes as well as $C_3$-impurities such as methyl acetylene, allene, propylene and propane as well as $C_5$-hydrocarbon impurities.

The use herein of the phrase—for a period of time sufficient to establish—is intended to define the residence time of the hydrocarbon-containing cuprous ammonium acetate solution in the settling zone under the conditions provided. The residence time is not necessarily a critical feature of the invention and can be varied over a wide range of from about 10 minutes to three hours or more until the desired percentage of hydrocarbon is rejected from the cuprous ammonium acetate solution. Likewise, the temperature at which the settling zone is operated and maintained is also not necessarily a critical parameter of the invention. Generally, the use of an elevated temperature allows more rapid separation and development of two phases in the settling zone. Generally, the temperature of the settling zone can range from about 30° F. to about 100° F.

In carrying out the method of the invention any suitable settling zone can be employed of sufficient volume to allow creation of two phases and can be placed in parallel or in series, if desired, with the "hot rejector" of a cuprous ammonium acetate extraction unit. Typically, a settling chamber having dimensions three times as long as it is high is provided with an upper outlet for hydrocarbon product and a lower outlet for cuprous ammonium acetate solution. The upper outlet usually is connected to a recycle line for the CAA extraction unit while the lower outlet is connected to the desorber for subsequent desorption of the butadiene from the cuprous ammonium acetate solution. These outlets are preferably equipped with valves which can be actuated by a level controller. It has been found advantageous to control the hydrocarbon-containing CAA solution interface at about 1/10th of the height of the settling zone as measured from the upper face of the settling zone.

EXAMPLE

A series of runs were conducted in which a slipstream of hydrocarbon-containing cuprous ammonium acetate solution enriched in butadiene was bled from a commercial butadiene extraction unit into a horizontally dispersed elongated cylindrical settling zone about five feet in diameter and about 18½ feet long. A baffle with holes was provided at a distance of 18 inches from the point of entry of the enriched cuprous ammonium acetate solution. The interface level in the settling zone was maintained about 4 to 8 inches below the top of the zone by controlling the hydrocarbon outlet. The enriched cuprous ammonium acetate solution not bled from the system was passed through a conventional horizontally elongated rejector. The settling zone was equipped with a G-fin heater to provide adequate temperature control. The settling zone is operated by controlling a feed valve and a cuprous ammonium acetate solution outlet valve. As pointed out above, the level of the cuprous ammonium acetate solution in the settling zone also may be controlled by regulating the hydrocarbon outlet valve. After several volumes of flowing cuprous ammonium acetate solution had passed through the settling zone, samples were taken at the inlet feed, the hydrocarbon outlet and the cuprous ammonium acetate solution outlet. The analyses of these samples are reported in Table I along with the results of the data obtained. As demonstrated in the sole figure of the drawing, it may be observed by the correlation of the data of Table I that 93% of the $C_4$-hydrocarbon impurities can be removed by rejecting about 70% of the hydrocarbon contained in the cuprous ammonium acetate solution entering the settling zone. Thus, if a settling zone is fed with 96.0% 1,3-butadiene containing cuprous ammonium acetate solution, the rerun column overhead should be about 99.6% butadiene. As may also be observed from the data and the correlation converted therefrom as set forth in the sole figure, rejection of 70% of the hydrocarbon from the hydrocarbon-containing cuprous ammonium acetate solution entering the settling zone would require a temperature in the settling zone of about 80° F. and a residence time of said solution therein of about 15 minutes.

*It is also to be observed in the figure that the value of*

$$100\left(1-\frac{V_p}{V_f}\right)$$

*the volume percent of hydrocarbon rejected must be a value of at least about 40 in order to satisfy the equation set forth therefor. Hence, it is to be understood that in this disclosure, the volume percent of hydrocarbon rejection is always at least about 40.*

*This limitation becomes evident in view of the fact that when the values of*

$$100\left(1-\frac{V_p}{V_f}\right)$$

*the volume percent of hydrocarbon rejected, from the working examples of Table I are inserted into the mathematical equation, it will immediately be seen that the volume percent of hydrocarbon rejected must be at least a value of about 40 volume percent since values below about 40 volume percent do not fall on the plot of the figure.*

Various modifications of the invention will occur to persons skilled in the art. Thus, it is evident in lieu of the compounds of the specific examples, any of the compounds mentioned above can be employed with similar results. Therefore, it is not intended that the invention be limited in the patent granted except as necessitated by the appended claims.

TABLE I

| Run No. | Temp., ° F. | Res. Time, min. | Feed | | | | Bottom | | Product | |
|---|---|---|---|---|---|---|---|---|---|---|
| | | | Vol. Percent 1,3 BD | Wt. Percent 1,3 BD | Purity, Wt. Percent | $X_f$ $C_4$ Impurity, Vol. Percent | Vol. Percent, 1,3 BD | Wt. Percent, 1,3 BD | Purity, Wt. Percent | $X_p$ $C_4$ Impurity, Vol. Percent |
| 1 | 34 | 32 | 8.9 | 98.08 | 98.16 | 1.51 | 7.5 | 98.32 | 98.40 | 1.23 |
| 2 | 34 | 32 | 8.1 | 98.24 | 98.29 | 1.36 | 8.1 | 98.70 | 98.79 | 0.86 |
| 3 | 33 | 32 | 8.7 | 98.38 | 98.47 | 1.12 | 7.8 | 98.42 | 98.60 | 1.08 |
| 4 | 30 | 29 | 10.4 | 99.10 | 99.18 | 0.59 | 7.9 | 99.38 | 99.57 | 0.24 |
| 5 | 30 | 29 | 10.4 | 99.02 | 99.11 | 0.62 | 7.5 | 99.45 | 99.58 | 0.20 |
| 6 | 30 | 29 | 11.6 | 99.02 | 99.11 | 0.58 | 7.0 | 99.50 | 99.64 | 0.16 |
| 7 | 34 | 52 | 8.3 | 98.68 | 98.77 | 0.99 | 6.7 | 99.40 | 99.46 | 0.47 |
| 8 | 33 | 52 | 9.8 | 97.90 | 98.07 | 1.62 | 7.4 | 99.45 | 99.67 | 0.38 |
| 9 | 36 | 53 | 10.7 | 96.92 | 97.02 | 2.65 | 7.5 | 98.12 | 98.13 | 1.29 |
| 10 | 34 | 54 | 8.2 | 96.94 | 97.01 | 2.50 | 7.6 | 98.72 | 98.89 | 0.73 |
| 11 | 34 | 54 | 8.3 | 97.97 | 98.08 | 1.55 | 7.8 | 98.86 | 98.86 | 0.77 |
| 12 | 34 | 46 | 10.6 | 98.97 | 99.05 | 0.68 | 7.4 | 99.43 | 99.57 | 0.17 |
| 13 | 33 | 48 | 9.5 | 98.93 | 98.96 | 0.65 | 6.9 | 99.53 | 99.55 | 0.19 |
| 14 | 32 | 53 | 10.5 | 97.83 | 97.96 | 1.80 | 7.2 | 99.24 | 99.42 | 0.45 |
| 15 | 32 | 53 | 10.5 | 98.24 | 98.35 | 1.49 | 6.7 | 99.28 | 99.46 | 0.40 |
| 16 | 98 | 20 | 13.9 | 98.84 | 98.94 | 0.94 | 4.2 | 99.46 | 99.61 | 0.24 |
| 17 | 80 | 15 | 11.9 | 98.51 | 98.55 | 1.19 | 4.2 | 99.36 | 99.67 | 0.12 |
| 18 | 33 | 103 | 9.6 | 97.46 | 97.56 | 2.27 | 7.6 | 98.92 | 99.14 | 0.66 |
| 19 | 33 | 100 | 10.8 | 98.81 | 98.94 | 0.82 | 6.9 | 99.63 | 99.80 | 0.08 |
| 20 | 34 | 103 | 10.0 | 98.77 | 99.18 | 0.79 | 6.9 | 99.52 | 99.68 | 0.13 |
| 21 | 35 | 186 | 9.4 | 98.92 | 99.06 | 0.63 | 7.0 | 99.51 | 99.70 | 0.10 |
| 22 | 38 | 186 | 8.1 | 99.02 | 99.15 | 0.59 | 6.6 | 99.50 | 99.68 | 0.12 |
| 23 | 84 | 15 | 13.3 | 98.99 | 99.10 | 0.79 | 3.9 | 99.53 | 99.66 | 0.06 |
| 24 | 84 | 15 | 12.5 | 99.14 | 99.23 | 0.68 | 3.6 | 99.65 | 99.85 | 0.05 |
| 25 | 84 | 15 | 11.5 | 99.24 | 99.33 | 0.58 | 4.1 | 99.68 | 99.75 | 0.04 |
| 26 | 98 | 30 | 12.5 | 98.91 | 99.02 | 0.93 | 3.3 | 99.65 | 99.84 | 0.09 |
| 27 | 84 | 30 | 12.4 | 98.85 | 98.96 | 0.99 | 3.4 | 99.80 | 99.83 | 0.08 |
| 28 | 79 | 30 | 11.6 | 98.74 | 98.85 | 1.09 | 3.9 | 99.61 | 99.85 | 0.09 |
| 29 | 83 | 30 | 12.5 | 96.37 | 96.52 | 3.40 | 3.9 | 99.46 | 99.63 | 0.21 |
| 30 | 84 | 30 | 11.8 | 96.86 | 97.03 | 2.87 | 3.8 | 99.38 | 99.68 | 0.22 |
| 31 | 81 | 15 | 12.5 | 97.60 | 97.75 | 2.16 | 3.9 | 99.43 | 99.73 | 0.20 |
| 32 | 80 | 15 | 12.0 | 97.83 | 97.90 | 1.92 | 4.0 | 99.42 | 99.42 | 0.15 |
| 33 | 47 | 30 | 13.3 | 98.70 | 98.92 | 1.03 | 6.6 | 99.39 | 99.67 | 0.30 |
| 34 | 48 | 30 | 12.2 | 98.40 | 98.61 | 1.35 | 6.0 | 99.24 | 99.29 | 0.40 |
| 35 | 68 | 30 | 11.8 | 97.59 | 97.76 | 2.19 | 5.4 | 99.00 | 99.37 | 0.59 |
| 36 | 69 | 30 | 11.4 | 97.28 | 97.47 | 2.49 | 5.3 | 99.12 | 99.46 | 0.51 |
| 37 | 72 | 30 | 11.8 | 97.84 | 98.02 | 1.98 | 5.3 | 99.00 | 99.30 | 0.65 |
| 38 | 73 | 30 | 11.6 | 98.30 | 98.45 | 1.55 | 4.9 | 99.40 | 99.63 | 0.37 |
| 39 | 75 | 54 | 12.4 | 98.35 | 98.46 | 1.54 | 5.2 | 99.46 | 99.61 | 0.39 |
| 40 | 73 | 30 | 12.4 | 97.78 | 97.94 | 2.06 | 4.3 | 99.44 | 99.65 | 0.35 |
| 41 | 75 | 54 | 11.9 | 98.15 | 98.25 | 1.75 | 5.0 | 99.33 | 99.49 | 0.51 |
| 42 | 72 | 8 | 11.8 | 97.94 | 98.06 | 1.94 | 5.7 | 99.16 | 99.34 | 0.66 |

| Run No. | Hydrocarbon | | Vol. Percent Hydrocarbon | | $1-\frac{V_p}{V_f}$ Volume Percent Hydro-Carbon Rejected | Volume Percent $C_4$ Impurities Rejected | Rerun Overhead Purity | Rejector Overhead Purity | Rejection Temp. (° F.) | Purity Improvement, Wt. Percent | |
|---|---|---|---|---|---|---|---|---|---|---|---|
| | Wt. Percent, 1,3 BD | $C_4$ Impurity, Wt. Percent | Feed $V_f$ | Bottom, $V_p$ | | | | | | Present Method | Conventional Method |
| 1 | 93.57 | 5.68 | 9.06 | 7.63 | 15.8 | 32.8 | 98.87 | 96.9 | ---- | ---- | ---- |
| 2 | 93.48 | 5.68 | 8.25 | 8.20 | ---- | ---- | 98.83 | 96.7 | ---- | ---- | ---- |
| 3 | 93.61 | 5.55 | 8.85 | 7.94 | 10.3 | 13.5 | 98.71 | 96.7 | ---- | ---- | ---- |
| 4 | 97.88 | 1.61 | 10.50 | 7.95 | 24.3 | 69.2 | 99.44 | 98.7 | ---- | 0.39 | 0.16 |
| 5 | 97.98 | 1.56 | 10.51 | 7.45 | 29.1 | 77.1 | 99.45 | 98.8 | ---- | 0.47 | 0.32 |
| 6 | ---- | ---- | 11.71 | 7.03 | 39.9 | 83.4 | 99.45 | 98.9 | ---- | 0.53 | 0.34 |
| 7 | 94.43 | 5.09 | 8.41 | 6.74 | 19.9 | 62.0 | 98.71 | 96.8 | ---- | 0.31 | −0.06 |
| 8 | 94.58 | 4.96 | 10.01 | 7.43 | 25.8 | 82.6 | 99.12 | ---- | ---- | 1.60 | 1.05 |
| 9 | 92.32 | 6.69 | 11.13 | 7.65 | 30.6 | 66.3 | 98.30 | 96.1 | ---- | ---- | ---- |
| 10 | 92.34 | 6.66 | 8.46 | 7.69 | 9.1 | 73.5 | 98.44 | 96.4 | ---- | 1.88 | 1.43 |
| 11 | 92.81 | 6.20 | 8.47 | 7.89 | 6.9 | 53.8 | 98.68 | 97.1 | ---- | 0.78 | 0.60 |
| 12 | 97.84 | 1.66 | 10.71 | 7.45 | 30.4 | 82.6 | 99.36 | 97.2 | ---- | 0.52 | 0.31 |
| 13 | 97.72 | 1.62 | 9.60 | 6.93 | 27.8 | 78.9 | 99.33 | 98.6 | ---- | 0.59 | 0.37 |
| 14 | 95.93 | 3.70 | 10.73 | 7.25 | 32.4 | 83.1 | 99.24 | 98.4 | ---- | 1.46 | 1.28 |
| 15 | 96.49 | 3.21 | 10.69 | 6.74 | 37.0 | 83.1 | 99.28 | 98.6 | ---- | 1.11 | 0.93 |
| 16 | 97.95 | 1.87 | 14.07 | 4.22 | 70.0 | 92.3 | 99.18 | ---- | 90 | 0.67 | 0.24 |
| 17 | 97.86 | 1.98 | 12.08 | 4.23 | 65.0 | 97.4 | 99.10 | 97.9 | 90 | 1.12 | 1.55 |
| 18 | 95.15 | 4.45 | 9.85 | 7.67 | 22. | 77.3 | 98.70 | 96.4 | ---- | 1.58 | 1.14 |
| 19 | 97.62 | 1.95 | 10.92 | 6.92 | 36.6 | 93.8 | 99.30 | 98.4 | ---- | 0.86 | 0.36 |
| 20 | ---- | ---- | 10.12 | 6.93 | 31.5 | 88.7 | 99.25 | 98.4 | ---- | 0.50 | 0.07 |
| 21 | 97.17 | 2.30 | 9.50 | 7.03 | 26.0 | 88.2 | 99.11 | 98.1 | ---- | 0.64 | 0.05 |
| 22 | 97.13 | 2.28 | 8.17 | 6.63 | 18.8 | 83.5 | 99.15 | 98.1 | ---- | 0.53 | 0.35 |
| 23 | 98.58 | 1.25 | 13.43 | 3.91 | 70.8 | 97.8 | 99.50 | 98.8 | 94 | 0.56 | 0.40 |
| 24 | 98.84 | 1.05 | 12.61 | 3.61 | 71.2 | 97.9 | 99.50 | 98.8 | 94 | 0.62 | 0.27 |
| 25 | 98.20 | 1.62 | 11.59 | 4.02 | 65.3 | 97.6 | 99.50 | 99.0 | 94 | 0.42 | 0.17 |
| 26 | 98.53 | 1.36 | 12.64 | 3.31 | 73.8 | 97.5 | 99.45 | 98.5 | 96 | 0.62 | 0.43 |
| 27 | 98.45 | 1.46 | 12.55 | 3.41 | 72.7 | 97.7 | 99.40 | 98.5 | 90 | 0.87 | 0.44 |
| 28 | 98.15 | 1.73 | 11.74 | 3.91 | 66.6 | 97.2 | 99.40 | 98.3 | 87 | 1.00 | 0.55 |
| 29 | 95.17 | 4.68 | 12.97 | 3.93 | 69.5 | 98.1 | 98.25 | 95.0 | 92 | 3.11 | 1.73 |
| 30 | 95.83 | 4.04 | 12.18 | 3.82 | 68.7 | 97.6 | 98.45 | 96.0 | 94 | 2.65 | 1.42 |
| 31 | 97.61 | 2.22 | 12.91 | 3.92 | 69.6 | 97.2 | 98.70 | 96.0 | 96 | 1.98 | 1.05 |
| 32 | 96.67 | 3.21 | 12.26 | 4.02 | 67.2 | 97.4 | 98.92 | 97.0 | 96 | 1.87 | 1.02 |
| 33 | 98.50 | 1.87 | 13.48 | 6.65 | 50.6 | 85.7 | 99.40 | 98.5 | 91 | 0.75 | 0.75 |
| 34 | 96.94 | 2.98 | 12.42 | 6.04 | 51.2 | 85.5 | 99.30 | 98.5 | 89 | ---- | ---- |
| 35 | 95.64 | 4.27 | 12.08 | 5.46 | 54.9 | 87.7 | 98.80 | 97.0 | 86 | 1.61 | 1.04 |
| 36 | 95.40 | 4.51 | 11.72 | 5.35 | 54.4 | 90.5 | 98.50 | 96.0 | 87 | 1.99 | 1.03 |
| 37 | 96.45 | 3.53 | 12.17 | 5.36 | 56.1 | 85.6 | 98.80 | 96.8 | 93 | 1.28 | 0.72 |
| 38 | 97.27 | 2.73 | 11.83 | 4.93 | 58.3 | 90.1 | 99.10 | 97.8 | 94 | 1.18 | 0.65 |
| 39 | 97.93 | 2.07 | 12.61 | 5.23 | 58.4 | 89.5 | 99.50 | 98.0 | 93 | 1.15 | 1.04 |
| 40 | 96.85 | 3.13 | 12.68 | 4.33 | 65.9 | 94.2 | 99.00 | 97.3 | 93 | 1.69 | 1.06 |
| 41 | 97.38 | 2.62 | 12.12 | 5.03 | 58.4 | 87.9 | 99.45 | 97.8 | 92 | ---- | ---- |
| 42 | 97.43 | 2.57 | 12.05 | 5.75 | 52.2 | 83.7 | 99.4 | 97.3 | 90 | ---- | ---- |

NOTES:

"Purity" is the sum of 1,3 BD and 1,2[BC] *BD*.

Some of the production unit data are estimated because scheduled anaylsis or log reading did not coincide with sample time on test unit.

Vol. percent 1,3 BD is percent of total rich solvent-wt. percent 1,3 BD is percent of contained hydrocarbon.

What is claimed is:

1. The method of purifying a hydrocarbon-containing cuprous ammonium acetate solution having therein butadiene and $C_4$-hydrocarbon impurities which comprises introducing an essentially single phase hydrocarbon-containing cuprous ammonium acetate solution into a quiescent settling zone controlled and maintained under non-turbulent flow conditions for a period of time sufficient to establish the condition wherein the ratio $$X_p/X_f$$

is a function of the ratio $$1-\frac{V_p}{V_f}$$

characterized by the equation:

$$\log_{10}\left(\frac{X_p}{X_f}\right)=-3.58\left(1-\frac{V_p}{V_f}\right)+1.37$$

wherein $X_p$ represents the $C_4$-hydrocarbon impurities, excluding 1,2-butadiene, expressed as volume percent of the total hydrocarbons contained in the cuprous ammonium acetate solution leaving the settling zone, $X_f$ represents the $C_4$-hydrocarbon impurities, excluding 1,2-butadiene, expressed as volume percent of the total hydrocarbons contained in the cuprous ammonium acetate solution feed to the settling zone, $V_p$ represents the volume percent of total hydrocarbons in the cuprous ammonium acetate solution leaving the settling zone, $V_f$ represents the volume percent of total hydrocarbons in $$\left[100\left(1\frac{V_p}{V_f}\right)\right]$$

the cuprous ammonium acetate solution fed to the settling zone, and $$100\left(1-\frac{V_p}{V_f}\right)$$

represents the volume percent of hydrocarbons rejected from the cuprous ammonium acetate solution in the settling zone *and is a value of at least about 40.*

2. The method of purifying a hydrocarbon-containing cuprous ammonium acetate solution having therein butadiene and $C_4$-hydrocarbon impurities which comprises introducing an essentially single phase hydrocarbon-containing cuprous ammonium acetate solution into a quiescent settling zone controlled and maintained under non-turbulent flow conditions for a period of time sufficient to establish the condition wherein the ratio $$X_p/X_f$$

is a function of the ratio $$1-\frac{V_p}{V_f}$$

characterized by the equation:

$$\log_{10}\left(\frac{X_p}{X_f}\right)=-3.58\left(1-\frac{V_p}{V_f}\right)+1.37$$

wherein $X_p$ represents the $C_4$-hydrocarbon impurities, excluding 1,2-butadiene, expressed as volume percent of the total hydrocarbons contained in the cuprous ammonium acetate solution leaving the settling zone, $X_f$ represents the $C_4$-hydrocarbon impurities, excluding 1,2-butadiene, expressed as volume percent of the total hydrocarbons contained in the cuprous ammonium acetate solution feed to the settling zone, $V_p$ represents the volume percent of total hydrocarbons in the cuprous ammonium acetate solution leaving the settling zone, $V_f$ represents the volume percent of total hydrocarbons in the cuprous ammonium acetate solution fed to the settling zone and $$\left[100\left(1\frac{V_p}{V_f}\right)\right]$$

$$100\left(1-\frac{V_p}{V_f}\right)$$

represents the volume percent of hydrocarbons rejected from the cuprous ammonium acetate solution in the settling zone, *and is a value of at least about 40,* and recovering a hydrocarbon-containing cuprous ammonium acetate solution wherein the butadiene purity is higher than the butadiene purity in said essentially single phase hydrocarbon-containing cuprous ammonium acetate solution.

3. The method of claim 1 wherein the period of time is a residence time of from about ten minutes to about three hours.

4. The method of claim 1 wherein the temperature maintained in the settling zone is a temperature in the range of from about 30° F. to about 100° F.

5. The method of claim 1 wherein the period of time is a residence time of from about ten minutes to about three hours and the temperature maintained in the settling zone is a temperature in the range of from about 30° F. to about 100° F.

References Cited

The following references, cited by the Examiner, are of record in the patented file of this patent or the original patent.

UNITED STATES PATENTS

| | | | |
|---|---|---|---|
| 2,388,928 | 11/1945 | Morrell et al. | 260—681.5 |
| 2,884,474 | 4/1959 | Finigan et al. | 260—681.5 |
| 2,944,095 | 7/1960 | Kupa et al. | 260—681.5 |

DELBERT E. GANTZ, Primary Examiner

G. E. SCHMITKONS, Assistant Examiner